US010265674B2

(12) United States Patent
Ventikos et al.

(10) Patent No.: US 10,265,674 B2
(45) Date of Patent: Apr. 23, 2019

(54) PRODUCING A LOCALIZED COMPRESSION OF GAS BETWEEN A CONCAVE SURFACE AND AN IMPACTING JET THAT IS FORMED BY USING A SHOCKWAVE TO COLLAPSE A GAS POCKET

(71) Applicant: ISIS INNOVATION LIMITED, Oxford (GB)

(72) Inventors: Yiannis Ventikos, Oxford (GB); Nicholas Hawker, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 199 days.

(21) Appl. No.: 15/203,854

(22) Filed: Jul. 7, 2016

(65) Prior Publication Data
US 2016/0314857 A1    Oct. 27, 2016

Related U.S. Application Data

(62) Division of application No. 13/696,690, filed as application No. PCT/GB2011/050889 on May 9, 2011, now Pat. No. 9,530,524.

(30) Foreign Application Priority Data

May 7, 2010    (GB) .................................. 1007655.2

(51) Int. Cl.
  *B01J 19/08*    (2006.01)
  *B01J 19/10*    (2006.01)
  *G21B 3/00*    (2006.01)
(52) U.S. Cl.
  CPC ............... *B01J 19/10* (2013.01); *G21B 3/006* (2013.01); *G21B 3/008* (2013.01)

(58) Field of Classification Search
  CPC ........ G21B 3/006; G21B 3/008; B01J 19/008; B01J 19/10
  USPC .......................... 376/100, 149, 152; 422/128
  See application file for complete search history.

(56) References Cited

U.S. PATENT DOCUMENTS

| 3,417,829 | A | 12/1968 | Acheson et al. |
| 3,481,784 | A | 12/1969 | Karpovich |
| 3,624,239 | A | 11/1971 | Fraas |
| 3,858,171 | A | 12/1974 | Pauletich |
| 3,953,617 | A | 4/1976 | Smith et al. |

(Continued)

FOREIGN PATENT DOCUMENTS

| CN | 1603772 A | 4/2005 |
| CN | 102759439 A | 10/2012 |

(Continued)

OTHER PUBLICATIONS

Goverdovskii et al "On the prospects of bubble cavitation-induced fusion"; Phys. Usp.; (2013); 56; 423-425.

(Continued)

*Primary Examiner* — Jack W Keith
*Assistant Examiner* — Daniel Wasil
(74) *Attorney, Agent, or Firm* — Cantor Colburn LLP

(57) ABSTRACT

There is provided a method of producing a localized concentration of energy. The method includes creating at least one shockwave propagating through a non-gaseous medium so as to be incident upon a pocket of gas within the medium wherein the pocket of gas is attached to a non-planar surface shaped to concentrate the intensity of the shockwave which is incident upon the pocket of gas.

13 Claims, 5 Drawing Sheets

(56) References Cited

U.S. PATENT DOCUMENTS

| | | |
|---|---|---|
| 4,333,796 A | 6/1982 | Flynn |
| 4,890,603 A | 1/1990 | Filler |
| 7,445,319 B2 | 11/2008 | Dean, Jr. et al. |
| 2003/0173307 A1 | 9/2003 | Carlson et al. |
| 2003/0215046 A1 | 11/2003 | Hornkohl |
| 2006/0043828 A1 | 3/2006 | Tessien et al. |
| 2006/0187277 A1 | 8/2006 | Dean, Jr. et al. |
| 2008/0037694 A1 | 2/2008 | Dean, Jr. et al. |
| 2008/0146971 A1 | 6/2008 | Ueblacker et al. |
| 2010/0124142 A1 | 5/2010 | Laugharn, Jr. et al. |
| 2011/0003370 A1 | 1/2011 | Gordon et al. |
| 2011/0095111 A1 | 4/2011 | Briz et al. |
| 2011/0228890 A1 | 9/2011 | Dearn, Jr. et al. |
| 2012/0164113 A1 | 6/2012 | Victor |
| 2012/0281797 A1 | 11/2012 | Ventikos et al. |
| 2012/0288047 A1 | 11/2012 | Ventikos et al. |
| 2012/0291765 A1 | 11/2012 | Griggs |
| 2013/0114774 A1 | 5/2013 | Ventikos et al. |
| 2014/0042088 A1 | 2/2014 | Yoshida et al. |
| 2014/0363855 A1 | 12/2014 | Gordon et al. |
| 2015/0139378 A1 | 5/2015 | Hawker et al. |
| 2016/0012921 A1 | 1/2016 | Ventikos et al. |
| 2016/0019984 A1 | 1/2016 | Ventikos et al. |

FOREIGN PATENT DOCUMENTS

| | | |
|---|---|---|
| JP | H04158200 | 6/1992 |
| JP | H06198496 | 7/1994 |
| JP | 2001193381 | 7/2001 |
| WO | 02097823 A1 | 12/2002 |
| WO | 03034441 A1 | 4/2003 |
| WO | 2011064592 A1 | 6/2011 |
| WO | 2011064594 A2 | 6/2011 |
| WO | 2011138622 A1 | 11/2011 |

OTHER PUBLICATIONS

Lindstrom "Believable statements of uncertainty and believable science"; J Radioanal Nucl Chem; (2017); 311; 1019-1022.
"Report of the Investigation Committee in the Matter of Dr. Rusi P. Taleyarkhan." http://news.uns.purdue.edu/x/2008b/080718PurdueReport.pdf last accessed Sep. 27, 2012.
Barbaglia et al.; "Search of Fusion Reactions During the Cavitation of a Single Bubble in Deuterated Liquids"; Physica Scripta, vol. 72; 2005; pp. 75-78.
Bourne et al.; "The temperature of a shock-collapsed cavity"; Proceedings of the Royal Society London, Series A, No. 459; 2003, pp. 1851-1861.
Bourne, et al. Shock-induced collapse and luminescence by cavities, Philosophical Transactions of the Royal Society London, Series A., Feb. 1999, pp. 295-311, vol. 357, No. 1751, XP00000265463.
Brenner et al.; "Single-bubble sonoluminescence"; Rev. Mod. Phys. vol. 74, No. 2; Apr. 2002; p. 425-484.
Brujan et al.; "Properties of luminescence from laser-created bubbles in pressurized water"; The American Physical Society, vol. 72, No. 6; Dec. 21, 2005, pp. 066310-1-066310-6.
Brunton, "High speed liquid impact", Royal Society of London Philosophical Transactions Mathematical, Physical and Engineering Sciences, The Royal Society , Jul. 28, 1966, pp. 79-85, vol. 260, London GB, XP008135518.
Dear et al.; "High-speed photography of surface geometry effects in liquid/solid impact"; Journal of Applied Physics, vol. 63, No. 4; Feb. 15, 1988; pp. 1015-1021; XP002633349.
Decorso et al.; "Erosion by Liquid Impact"; ASTM International; 1962; p. 41.
Ed. "Bubble fusion: silencing the hype," Mar. 8, 2006 doi: 10.1038/news060306-1 last accessed Sep. 27, 2006, arXiv:physics/0603060v2 last accessed Sep. 27, 2012.
Gaitan et al.; "Sonoluminescence and bubble dynamics for a single, stable, cavitation bubble", Journal Acoustical Society of America, Jun. 1992, pp. 3166-3183, vol. 91, No. 6.
Gaitan et al.; "Transient cavitation in high-quality-factor resonators at high static pressures"; Journal of the Acoustical Society of America, vol. 127, No. 6; Jun. 2010; pp. 3456-3465; XP002715356.
Galonsky; "Tabletop Fusion Revisted"; Science, vol. 297; Sep. 6, 2002; pp. 1645-1647.
Great Britain Office Action for Great Britain Application No. 1208939.7; dated Sep. 24, 2012; 3 pages.
Haller et al.; "Computational study of high-speed liquid droplet impact", Journal of Applied Physics, American Institute of Physics, Sep. 1, 2002, pp. 2821-2828, vol. 92, No. 5, XP012057199.
Haller et al.; "Wave structure in the contact line region during high speed droplet impact on a surface: Solution of the Riemann problem for the stiffened gas equation of state"; Journal of Applied Physics, vol. 93, No. 5; Mar. 1, 2003; pp. 3090-3097.
Hawker et al.; "Interaction of a Strong Shockwave with a Gas Bubble in a Liquid Medium: a Numerical Study"; J. Fluid Mech., vol. 701; 2012; pp. 59-97.
Hawker et al.; "Shock/Gas Bubble Interactions in infinite and Finite Volumes of Liquid", 2nd Micro and Nano Flows Confernece, Department of Engineering Science, University of Oxford, Sep. 1-2, 2009, pp. 1-5, West London UK.
International Search Report and Written Opinion for International Application No. PCT/GB2010/051974; International Filing Date Nov. 26, 2010; dated Apr. 28, 2011; pp. 1-11.
International Search Report and Written Opinion for International Application No. PCT/GB2010/051976; International Filing Date Nov. 26, 2010; dated Jun. 9, 2011; pp. 1-11.
International Search Report and Written Opinion for International Application No. PCT/GB2011/05088; International Filing Date May 9, 2011; dated Sep. 16, 2011; pp. 1-12.
International Search Report and Written Opinion for International Application No. PCT/GB2013/051297; International Filing Date May 20, 2013; dated Nov. 20, 2013; pp. 1-11.
International Search Report for International Application No. PCT/GB2014/050661, International Filing Date Mar. 6, 2014, dated Jul. 4, 2014, 5 pages.
International Search Report for International Application No. PCT/GB2014/050663; International Filing Date Mar. 6, 2014, dated Jul. 4, 2014, 5 pages.
Japan Office Action for Japanese Patent Application No. 2012-540500, OA transmission dated Apr. 28, 2015, 2 pages, non-English Translation.
Japan Office Action for Japanese Patent Application No. 2012-540500, OA transmission dated Apr. 28, 2015, 3 pages, English Translation.
Japan Office Action for Japanese Patent Application No. 2013-508557, OA Transmission Dated Mar. 10, 2015, 5 pages, non-English Translation.
Japan Office Action for Japanese Patent Application No. 2013-503557, OA Transmission Dated Mar. 10, 2015, 9 pages, English Translation.
Johnsen et al.; "Numerical simulations of non-spherical bubble collapse"; Journal of Fluid Mechanics, vol. 629; Jun. 25, 2009; pp. 231-262; XP002715357.
Johnsen et al.; "Shock-Induced Collapse of a Gas Bubble in Shockwave Lithotripsy"; J. Acoustical Society of America, vol. 124, No. 4; Oct. 2008; pp. 2011-2020.
Kroninger et al.; "Particle tracking velocimetry of the flow field around a collapsing cavitation bubble"; Exp Fluids, vol. 48, 2010; pp. 395-408.
Lauer et al.; "Numerical Investigation of Collapsing Cavity Arrays"; Physics of Fluids, vol. 24; 2012; pp. 1-24.
Lauterborn et al.; "News from bubble dynamics: high static pressures, shock waves and interior dynamics": The 19th International Symposium on Nonlinear Acoustics; 2012; 1 page.
Matthujak et al.; "High Speed Jet Formation by Impact Acceleration Method"; Shock Waves, vol. 16; 2007; pp. 405-419.
Naranjo; "Comment on Nuclear Emissions During Self-Nucleated Acoustic Cavitation", Sep. 12, 2006 arxiv: physics/0603060v2 last accessed Sep. 27, 2012.
Peplow; "Desktop Fusion is Back on the Table," Jan. 10, 2006, doi:10.1038/news060109-5 last accessed Sep. 27, 2012.

(56) References Cited

OTHER PUBLICATIONS

Philipp et al.; "Cavitation erosion by single laser-produced bubbles"; J. Fluid Mech., vol. 361; 1998; pp. 75-116.
Plesset et al.; "Bubble Dynamics and Cavitation"; Annual Review Fluid Mech., vol. 9; 1977; pp. 145-185.
Range et al.; "Influence of surface roughness on liquid drop impact"; Journal of Colloid and Interface Science, vol. 203; 1998; pp. 16-30.
Reich; "Bubble-fusion scientist debarred from federal funding"; Nature; Nov. 23, 2009; pp. 1-4; doi: 10.1038/news.2009.1103 last accessed Sep. 27, 2012.
Rein et al.; "Phenomena of liquid drop impact on solid and liquid surfaces"; Fluid Dynamics Research, North-Holland, vol. 12, No. 2; Aug. 1, 1993; pp. 61-93.
Seife; "'Bubble Fusion' Paper Generates a Tempest in a Beaker"; Science; Mar. 8, 2002; vol. 295; p. 1808-1809.
Shapira et al.; "Nuclear Fusion in Collapsing Bubbles—Is It There? An Attempt to Repeat the Observation of Nuclear Emissions from Sonoluminescence," Phys. Rev. Lett. v. 89, n. 10, Sep. 2, 2002, pp. 104302-1-104302.4.
Shi et al.; "Generation of High-Speed Liquid Jets by High-Speed Impact of a Projectile"; JSME Internation Journal, Series B, vol. 38, No. 2; 1995; pp. 181-190.
Shi et al.; "The Measurement of Impact Pressure and Solid Surface Response in Liquid—Solid Impact up to Hypersonic Range"; Wear, vol. 186-187; 1995; pp. 352-359.
Sivakumar et al.; "Spreading behavior of an impacting drop on a structured rough surface"; Physics of Fluids, vol. 17, No. 10; Oct. 2005; pp. 1-10.
Surov; "Interaction of a Shock Wave with a Bubble Screen"; Technical Physics, vol. 44, No. 1; Jan. 1999; pp. 37-43.
Sushchikh et al. "Shock waves and flow patterns in a shock-induced bubble collapse", American Institute of Aeronautics and Astronautics, 2005, pp. 1-12, vol. AIAAA 2005-1291, XP000002654462.
Swantek et al.; "Collapse of Void Arrays Under Stress Wave Loading"; Journal of Fluid Mechanics, vol. 649; Apr. 2010; pp. 399-427.
Taleyarkhan et al. "Evidence for Nuclear Emissions During Acoustic Cavitation", SCIENCE, Research Articles, Mar. 2, 2002, pp. 1868-1873, vol. 295, downloaded from www.sciencemag.org on Nov. 24, 2009.
Taleyarkhan et al.; "Additional evidence of nuclear emissions during acoustic cavitation"; Phys. Rev. E vol. 69; Mar. 22, 2004, pp. 036109-1-036109-11.
Taleyarkhan et al.; "Nuclear Emissions During Self-Nucleated Acoustic Cavitation"; Phys. Rev. Lett. vol. 96; Jan. 10, 2006; pp. 034301-1-034301-4.
Taleyarkhan et al.; "Reply"; The American Physical Society; Physical Review Letters, PRL 97; 2006; p. 149404-1.
Tullis; "Cavitation Guide for Control Valves"; Tullis Engineering Consultants NUREG/CR-6031; Apr. 1993; pp. 1-106, XP000002654460, http://www.iaea.org/inis/collectin/NCLCollectionStore/_Public/24/072/24072618.pdf.
Wolfrum et al.; "Luminescence of transient bubbles at elevated ambient pressures"; The American Physical Society, vol. 64; Sep. 25, 2001; pp. 046306-1-046306-5.
Written Opinion for International Application No. PCT/GB2014/050661, International Filing Date Mar. 6, 2014, dated Jul. 4, 2014, 7 pages.
Written Opinion for International Application No. PCT/GB2014/050663, International Filing Date Mar. 6, 2014, dated Jul. 4, 2014, 7 pages.
Xu et al., "Confirmatory experiments for nuclear emissions during acoustic cavitation," Nuc. Engr. Des. v. 235, Feb. 21, 2005, p. 1318-1324.

PRODUCING A LOCALIZED COMPRESSION OF GAS BETWEEN A CONCAVE SURFACE AND AN IMPACTING JET THAT IS FORMED BY USING A SHOCKWAVE TO COLLAPSE A GAS POCKET

CROSS REFERENCE TO RELATED APPLICATIONS

This application is a divisional application of U.S. patent application Ser. No. 13/696,690 filed on Jan. 21, 2013 which is a U.S. national stage of PCT international application no. PCT/GB2011/050889 filed on May 9, 2011 which claims priority to GB application no. 1007655.2 filed on May 7, 2011, the disclosure of all of these applications is incorporated herein by reference, in its entirety.

TECHNICAL FIELD

This invention relates to methods and apparatuses for producing very high localized energies. It relates particularly, although not exclusively, to producing a localised compression of gas, which compression generates localized energies which potentially may be high enough to cause nuclear fusion.

BRIEF DESCRIPTION OF RELATED ART

The development of fusion power has been an area of massive investment of time and money for many years. This investment has been largely centered on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small areas.

Much of the confidence in the potential in alternative methods of inertial confinement fusion comes from observations of a phenomenon called sonoluminescence. This occurs when a liquid containing appropriately sized bubbles is driven with a particular frequency of ultrasound. The pressure wave causes bubbles to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A., *Journal of the Acoustical Society of America*, 91(6), 3166-3183 June (1992)]. There have been various efforts to intensify this process and one group has claimed to observe fusion [Taleyarkhan, R. P., West, C. D., Cho, J. S., Lahey, R. T., Nigmatulin, R. I., and Block, R. C., *Science*, 295(5561), 1868-1873 March (2002)]. However, the observed results have not yet been validated or replicated, in spite substantial effort [Shapira, D. and Saltmarsh, M., *Physical Review Letters*, 89(10), 104302 September (2002)]. This is not the only proposed mechanism that has led to luminescence from a collapsing bubble; however it is the most documented. Luminescence has also been observed from a bubble collapsed by a strong shock wave [Bourne, N. K. and Field, J. E., *Philosophical Transactions of the Royal Society of London Series A-Mathematical Physical and Engineering Sciences*, 357(1751), 295-311 February (1999)]. It is this second mechanism, i.e. the collapse of a bubble using a shockwave, to which this invention relates.

It has been proposed in U.S. Pat. No. 7,445,319 to fire spherical drops of water moving at very high speed (~1 km/s) into a rigid target to generate an intense shock wave. This shock wave can be used to collapse bubbles that have been nucleated and subsequently have expanded inside the droplet. It is inside the collapsed bubble that the above-mentioned patent expects fusion to take place. The mechanism of shockwave generation by high-speed droplet impact on a surface has been studied experimentally and numerically before and is well-documented (including work by one of the present patent inventors, [Haller, K. K., Ventikos, Y., Poulikakos, D., and Monkewitz, P., *Journal of Applied Physics*, 92(5), 2821-2828 September (2002)].) The present invention differs from U.S. Pat. No. 7,445,319, even though the fundamental physical mechanisms are similar, because it does not utilize a high speed droplet impact.

BRIEF SUMMARY

The present invention aims to provide alternatives to the aforementioned techniques and may also have other applications. When viewed from a first aspect the invention provides a method of producing a localized concentration of energy comprising creating at least one shockwave propagating through a non-gaseous medium so as to be incident upon a pocket of gas within the medium wherein the pocket of gas is attached to a surface comprising a depression shaped so as partially to receive the gas pocket.

The invention also extends to an apparatus for producing a localized concentration of energy comprising:
  a non-gaseous medium having therein a pocket of gas, wherein the pocket of gas is attached to a surface comprising a depression shaped so as partially to receive the gas pocket; and
  means for creating at least one shockwave propagating through said medium so as to be incident upon said pocket of gas.

It is known to those skilled in the art that in general an interaction between a shockwave in a non-gaseous medium and a gas bubble in that medium can generate a high speed transverse jet of the non-gaseous medium that moves across the bubble, impacting the leeward bubble wall. This is one of the mechanisms which gives rise to the well-known problem of cavitation damage of surfaces when shockwaves are generated in the presence of micro-bubbles formed on the surface. In accordance with the present invention however, the inventors have appreciated that this naturally-occurring phenomenon can be appropriately adapted and harnessed to produce very high localized energy concentration which can be used, e.g. to potentially create nuclear fusion as will be explained later.

In embodiments of the invention, the phenomenon of a jet being formed during bubble collapse is controlled to promote formation of this transverse jet and enhancement of its speed, and the surface depression is designed to receive the transverse jet impact whilst trapping a small volume of the original gas pocket between the impacting jet and itself. This leads to various physical mechanisms that cause very substantial energy focusing in this volume of trapped gas.

More particularly by designing the surface depression explicitly to receive the high speed jetting formed by the interaction of the incident shockwave with the gas pocket, then as the incident shock interacts with the surface of the gas pocket it forms a transmitted shock and a reflected rarefaction. If the contact is the correct shape, i.e. curving away from the incident shockwave, then this rarefaction will act to focus the flow to a point. This then results in the formation of the high speed transverse jet which can, purely as an example, reach over 2000 ms$^{-1}$ for a 1 GPa shockwave. When this jet strikes the surface of the depression a strong shockwave is generated within by the force of the impact in a manner analogous to the high speed droplet impact situation described in U.S. Pat. No. 7,445,319.

The shape of the surface in the depression opposite where the shockwave is incident could be flat so that the jet contacts the surface at a point. In a preferred set of embodiments however the surface depression and gas pocket are arranged such that the initial contact region is a curve which forms a closed loop—e.g. a ring. This makes it possible to trap a portion of the gas pocket between the jet tip and the edge of the depression. To achieve this, a section of the target surface has a curvature greater than that of the tip of the jet and this part of the surface is placed such that the jet impacts into it. Upon impacting, a toroidal shockwave is generated whose inner edge propagates towards the base of the depression and towards the trapped portion of gas. Combining this with the 'piston' effect of the gas halting the motion of the impacting jet yields extremely strong heating of the trapped gas. For example, for a given strength of shockwave the peak temperatures can be increased by over an order of magnitude by these arrangements as compared to a bubble attached to a planar surface.

The depression could take a number of shapes. In a set of embodiments it tapers in cross-section away from the mouth. The depression could resemble a dish—e.g. being continuously curved. The surface need not be continuously curved however. In a set of embodiments the surface more closely resembles a crack rather than a dish shape. This could be defined by stating that the depth is greater than the width or by the presence of a region of curvature at the tip of the crack greater than the curvature (or maximum curvature) of the portion of the gas pocket received in it. In one set of embodiments the surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial.

As above, the bubble could be small in comparison to the dimensions of the crack such that it is attached only to one side or it could be of similar size so as to close it off. It is not essential that there is only one depression which partly receives the gas pocket; a gas pocket could extend across, and be partially received by, a plurality of depressions.

In a particular set of embodiments the high speed jet is arranged to strike an area of surface that has been prepared with a particular roughness or microscopic shape such that many small portions of the pocket of gas are trapped between the jet tip and the target surface, i.e. the many small depressions are small in comparison to the size of the transverse jet tip.

When viewed from a second aspect the invention provides a method of producing a localized concentration of energy comprising creating at least one shockwave propagating through a non-gaseous medium so as to be incident upon a pocket of gas suspended within the medium, wherein the pocket of gas is spaced from a surface shaped so as at least partially to reflect said shockwave in such a way as to direct it onto said gas pocket.

The invention also extends to an apparatus for producing a localized concentration of energy comprising:
    a non-gaseous medium having therein a pocket of gas, wherein the pocket of gas is spaced from a surface; and
    means for creating at least one shockwave propagating through said medium so as to be incident upon said pocket of gas, wherein said surface is shaped so as at least partially to reflect said shockwave in such a way as to direct it onto said gas pocket.

Thus it will be seen that in accordance with this aspect of the invention the surface can be used to increase energy concentration in the gas by reflecting and/or focusing the shockwave onto it. The arrangement could be such that the shockwave impacts the surface before the gas pocket, but preferably the incident shock interacts with the gas pocket, causing it to collapse, and subsequently the incident shock and/or any of the numerous shocks generated by the cavity collapse (the existence of which will be known to those skilled in the art) interact with the target surface in such a way that they are reflected back towards the remains of the gas pocket, causing it to be collapsed a second or further times and thus enhancing the heating obtained.

There are many shapes and configurations which the surface might take. The configuration of the surface will determine how the shockwave interacts with it and the shape of the surface relative to the placement and shape of the gas pocket will determine how the shockwave interacts with the gas pocket, which it may do so before, simultaneously or after it interacts with the surface. This in turn affects the dynamics of the collapse and hence can increase temperatures and densities that are achievable through compression of the gas by the shockwave. In some embodiments, the peak temperatures can be increased by over an order of magnitude, when compared with a similar shock interacting with an isolated bubble.

The surface could be planar, but preferably it is non-planar—e.g. curved. The surface need not be continuously curved. For example, in one set of embodiments the concave surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial.

Preferably the surface is shaped in such a way that the reflected shocks are focused on the gas pocket. The spacing and geometry of the surface will determine (among other factors such as the speed of the shockwave through the medium) what interaction there is between the originally-incident and reflected shockwaves and the interaction of both of these with the gas pocket.

In a preferred set of embodiments the surface is shaped to focus the reflected shock to a point. Thus, for example, in the case of an essentially planar incident shockwave the surface could be parabolic or elliptic with the gas pocket at its focal point. However other shapes could be used to account for curvature in the wavefronts of the shockwave. It will be appreciated that the considerations are somewhat analogous to those in the focusing of radio waves and other electromagnetic waves.

The optimum spacing between the gas pocket and the surface will depend inter alia on the relative shapes of the reflecting surface and the gas pocket. In a particular set of embodiments of the invention the gas pocket is placed no more than three times the maximum radius of curvature of the closest section of surface away from the surface. In a particular example, the edge of the gas pocket closest to the surface is spaced from it by a distance of less than five times the dimension of the widest part of the bubble gas pocket, preferably less than three times the widest dimension, e.g. less than twice the widest dimension.

In a set of embodiments of the second aspect of the invention the shockwave is first incident upon the pocket of gas, compressing the volume of the pocket, and then the shockwave is reflected from the reflecting surface and is incident again on the pocket of gas, compressing it further. The spacing could be arranged so that the reflected shockwave is incident upon the pocket of gas when the volume of the pocket is still contracting from the initial shockwave, when it has reached a point of minimum volume from being compressed by the initial shockwave, or while the volume of the pocket is expanding after compression by the initial shockwave.

The collapse of the gas pocket by the incident shockwave produces several strong shockwaves as a result. In another set of embodiments in which the gas pocket is spaced from the surface, the target surface is optimized to reflect these generated shocks back towards the collapsed bubble. For example, the impact of the high speed transverse jet (described in the context of the first aspect of the invention) generates a shockwave that moves outwards from the point of impact dissipating as it travels. The surface could be shaped to conform to this shockwave and reflect it back towards the bubble, which would cause it to become a converging shockwave and to focus its energy back into the collapsed gas pocket.

When viewed from a third aspect the invention provides a method of producing a localized concentration of energy comprising creating at least one shockwave propagating through a non-gaseous medium so as to be incident upon a pocket of gas within the medium wherein the pocket of gas is attached to a non-planar surface shaped to concentrate the intensity of the shockwave which is incident upon the pocket of gas.

The invention also extends to an apparatus for producing a localized concentration of energy comprising:
   a non-gaseous medium having therein a pocket of gas, wherein the pocket of gas is attached to a surface; and
   means for creating at least one shockwave propagating through said medium so as to be incident upon said pocket of gas,
wherein said surface is shaped to concentrate the intensity of the shockwave which is incident upon the pocket of gas.

In accordance with this aspect of the invention the geometry of the surface can be used to control the reflections of the incident shockwave before it reaches the bubble such that the collapse of the bubble is intensified, for example such that the initially incident shockwave is more conforming to the bubble surface.

As before, there are many shapes and configurations which the surface might take to provide suitable regions for attaching the pocket of gas to the surface and the configuration of the surface will determine how the shockwave interacts with it and the shape of the surface relative to the placement and shape of the bubble will determine how the shockwave interacts with the gas pocket, which it may do so before, simultaneously or after it interacts with the surface. This in turn affects the dynamics of the collapse and hence can increase temperatures and densities that are achievable through compression of the gas by the shockwave. In some embodiments, the peak temperatures can be increased by over an order of magnitude, when compared with a similar shock interacting with an isolated bubble.

In a preferred set of embodiments, the surface is concave which has the effect of focusing the energy and intensifying the initial formation of the shockwave. In some non-limiting examples, the surface could have an ellipsoid or paraboloid shape. The surface need not be continuously curved. For example, in one set of embodiments the concave surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial. The gas pocket could be attached to any part of the surface but is preferably attached to the bottom or center point.

The dimensions of the gas pocket could be small in comparison to the width or depth of the concave surface—e.g. so as to be attached only to one side of the concavity, or it could of similar size—e.g. so as to attach to the surface in an annulus around the base of the depression.

The concavity could resemble a bowl—e.g. being continuously curved. In a set of embodiments however the surface more closely resembles a crack rather than a bowl shape. This could be defined by stating that the depth is greater than the width or by the presence of a region of curvature at the tip of the crack greater than the curvature (or maximum curvature) of the bubble. As above, the gas pocket could be small in comparison to the dimensions of the crack such that it is attached only to one side or it could be of similar size so as to close it off.

In one set of embodiments the shape of the surface is configured to trigger a transition from regular to Mach reflection of the incident shockwave, thus altering the shape of the shockwave that then reaches the gas pocket. In another set of embodiments the shape is controlled such that the reflections overlap and interact with one another, again acting to change the shape of the shockwave or interacting system of shockwaves when it contacts the gas pocket. By carefully controlling these factors an intensification of the peak temperatures can be obtained over the case where the surface is planar.

In a particular set of embodiments the surface might have a plurality of concave portions. Additionally or alternatively the or each concave portion may have a plurality of gas pockets attached thereto.

The aspects of the invention set out above are not mutually exclusive. Thus, for example, the surface might comprise a depression shaped so as partially to receive the gas pocket, thereby exploiting the jetting phenomenon and away from the depression the surface could be shaped to concentrate the intensity of the shockwave which is incident upon the pocket of gas. This could allow the properties of the jet—e.g. its speed—to be controlled to maximize the concentration of energy. Such combinations could be beneficial in providing the desired behavior of the shockwave within the depression in other ways.

In any embodiments where the bubble is attached to the surface this could be over a single contact patch or, by appropriate design of the surface texture, at a plurality of discrete contact points/regions.

As well as creating a particular shape for the target surface, in one set of embodiments the micro-structure or wetting characteristics of the surface can be optimized to control the speed of the shockwave near the surface, e.g. to increase the speed near the surface, thereby changing the shockwave's shape and hence the nature of the interaction between the shockwave and the gas pocket. As previously discussed, an appropriately shaped gas pocket can be used in this set of embodiments to match the shape of the shockwave to the shape of the gas pocket, thereby allowing the dynamics of the gas pocket's collapse to be controlled in order to maximize the temperature and density achieved on compression.

The surface to which the gas pocket is attached is not limited to having a single depression (e.g. to exploit the jetting phenomenon described above) and thus in one set of embodiments, the target surface comprises a plurality of depressions. Each individual depression may be shaped to encourage energy focusing by causing the shockwave to converge on one or more bubbles. That is to say, the surface may be prepared with more than one site where the shockwave will interact with a shaped section of surface containing either an attached or nearby gas pocket, thus providing infinite scalability. An advantage of employing a plurality of depressions is that a greater proportion of the shockwave energy may be harnessed. For example, a large pocket of gas could be spread across a plurality of depressions, or smaller individual volumes of gas could be located within each individual depression. For the former case, depending upon the number of such depressions, the size of an individual depression will be significantly smaller than the size of the pocket of gas. For a larger volume of medium able to accommodate a large number of depressions, this points towards simplicity of manufacturing for an energy-producing fusion apparatus.

Such pluralities of depressions could be formed in a number of ways. For example, a solid surface could be drilled or otherwise machined to produce depressions or pits. In one set of embodiments, however, the depressions are created by the surface texture of the surface. For example, the surface could be blasted with an abrasive material, etched or otherwise treated to give a desired degree of surface roughness which provides, at the microscopic level, a large number of pits or depressions.

The surface could be constructed from a solid, as implied in many of the embodiments outlined above, but it could equally well be a liquid. In the case of a solid, any of the proposed materials in U.S. Pat. No. 7,445,319 could be suitable. In the case of a liquid the required surface shape could be achieved in a number of ways. For example, the surface of a volume of liquid could be excited with a suitable vibration (e.g. using ultrasound or another method) to generate a wave having the desired shape. Alternatively the desired shape could be achieved through the contact angle between a liquid and a solid surface with appropriately matched wetting properties. Of course, this latter example shows that the surface could comprise a combination of solid and liquid. Where the target surface comprises a liquid it will generally be denser than the non-gaseous medium.

Of course, as has already been alluded to, some embodiments may comprise a plurality of pockets of gas within the medium. These pockets of gas may all be attached to the surface, may all be positioned near the target surface, or there may be a mixture.

The aspects of the invention described herein provide alternatives to the technique described in U.S. Pat. No. 7,445,319 which may carry their own benefits. The present inventors have recognized that there are significant challenges in the nucleation of a bubble in a droplet fired at high speed into a target, as suggested in U.S. Pat. No. 7,445,319. The timing will have to be very precise for the bubble to be at a favorable moment of its expand-collapse cycle when the shock strikes. The method by which the high speed droplets are created as required by U.S. Pat. No. 7,445,319 and detailed in U.S. Pat. No. 7,380,918 is also complex and expensive. By contrast such complexity and associated expense can be avoided in accordance with at least preferred embodiments of the present invention. Thus, the various aspects of the present invention provide much simpler techniques for compressing a volume of gas entrapped in a gas pocket as a shockwave simply needs to be created within the medium in which the gas pocket is formed. Moreover the theoretical and computer modeling of both techniques carried out by the present inventors suggests that the method in accordance with the present invention can give pressure and temperature intensities which are an order of magnitude greater than the method detailed in U.S. Pat. No. 7,445,319.

The more static framework that can be employed in accordance with the invention to compress a gas pocket using a shockwave allows much greater control (compared to a free bubble) over how the shockwave strikes and interacts with the pocket.

The initial shockwave could be created in a number of different ways by a number of different devices depending on the pressure required. For example, an explosive plane wave generator could be used to provide high intensity shockwaves. In preferred embodiments such an explosive device can create a shockwave pressure of between 0.1 GPa and 50 GPa.

The Applicant notes that the scope of the present invention does not extend to usage of a shockwave or static pressure causing an ultrasound shockwave, nor to usage of a device that generates ultrasound shockwaves (e.g. a lithotripsy device). Nor does the scope of the claimed invention include a pocket of gas being collapsed through the process of sonoluminescence. Nor does the scope of the invention include a nuclear fusion reaction.

The term "gas" as used herein should be understood generically and thus not as limited to pure atomic or molecular gases but also to include vapors, suspensions or micro-suspensions of liquids or solids in a gas or any mixture of these. The "non-gaseous medium" should be understood generically and thus could include liquids, non-Newtonian liquids, semi-solid gels, materials that are ostensibly solid until the passage of the shockwave changes their properties, suspensions or micro-suspensions and colloids. Examples include but are not limited to water, oils, solvents such as acetone, hydrogels and organogels. It should be understood that the liquid will have a greater density than the gas in the pocket.

The non-gaseous medium could be any suitable substance for creating a shockwave in, such as a liquid or a semi-solid gel. The gas pocket can then be provided by a bubble suspended within the liquid or gel medium in the required location, either near to or attached to the target surface. Using a gel or a viscous liquid has the advantage that it is easier to control the location of the bubble within the medium, compared to a lower viscosity liquid in which the buoyancy of the bubble may overcome the viscosity of the liquid. As will be appreciated, being able to control the position of the bubble is particularly important in the set of embodiments in which the bubble is located near to the target surface rather than being attached to it. In the set of embodiments in which the bubble is attached to the target surface, the nature of the target surface, e.g. the material, or any indentations or depressions in it, could help to adhere the bubble to the target surface. Using a gel or viscous liquid also has the advantage that it will be easier to control the detailed shape of the bubble.

Due to the more static nature of the setup of the device when compared to U.S. Pat. No. 7,445,319, much more control can be exercised over the shape of the bubble. In the set of embodiments where the bubble is attached to the surface, it may be spherical in shape apart from where it is truncated by its attachment to the target surface, for example it could be hemi-spherical. In some embodiments the bubble joins the target surface normal to it whereas in others a different angle is required. In a superset of these embodiments the bubble itself is not spherical in nature but takes a different shape that includes but is not limited to ellipsoids, cardioids, variations from spherical, cardioid or ellipsoid shape in which the surface has perturbations that could be described, for example, by a Fourier series and bubbles with other distinct shapes such as cones or trapezoids. It will be apparent that, for example, a conical bubble would be difficult to achieve in a true liquid medium but that in the case of a gel medium this set of embodiments becomes possible and could be advantageous. In the aspect of the invention in which the bubble is not attached to the surface, it is free from the constraints of the surface and is therefore able to take any shape required, such as ellipsoids, etc. In a set of such embodiments the shape of the bubble and the shape of the target surface can be appropriately matched, e.g. if the depression is hemispherical, the bubble would be spherical.

The gas pocket itself must be formed in some manner. In a particular set of embodiments it is nucleated using a system similar to that described in U.S. Pat. No. 7,445,319, where a laser is used in conjunction with nano-particles in the liquid to nucleate a bubble. In a different set of embodiments a bubble could be nucleated using an unstable emulsion of different liquids. In another set the bubble is nucleated using an appropriately targeted pressure wave designed to induce cavitation in the liquid. In the set of embodiments where the gas pocket is attached to the wall, a specifically controlled volume of gas could be pumped in through a passage in the target surface in order to expand a bubble on the surface. This set of embodiments has the advantage of great control over the contents and size of the gas pocket generated. In the set of embodiments where the liquid medium is a gel the gas pocket can be pre-manufactured by punching or otherwise cutting out or molding the correct shape from the gel block to be used.

In another set of embodiments the gas pocket is formed with the use of a pre-manufactured membrane that defines the boundary between the gas pocket and the medium and hence also defines the gas pocket's shape. The use of a thin membrane in this manner allows a decoupling of the liquid and gas materials, allowing any choice of combination of compositions to be made. It also allows the shape of the gas pocket to be controlled with a precision not available to other methods. The membrane could be formed from any suitable material, e.g. glass e.g. plastic e.g. rubber. Having a prefabricated membrane allows a liquid medium to be used more easily as the volume of gas is trapped against the target surface and therefore cannot float away or be otherwise disturbed. In a particular set of embodiments the membrane is frangible and is arranged to break upon impact from the shockwave such that it has no influence on the resulting dynamics. In one set of embodiments the prefabricated membrane includes a line or region of weakness, so that upon impact from the shockwave it breaks along the line or in the region of weakness. The line or region of weakness can be arranged so that the position of the breach has an influence on the ensuing flow patterns, for example this could help control the formation and dynamics of the transverse jetting. In another set of embodiments the membrane is designed to deform with the collapsing cavity. In the set of embodiments where the gas pocket is not attached to the surface, the concept of a gas pocket contained within a membrane is also useful. In a particular set of embodiments the gas pockets near the surface take the form of small glass beads filled with an appropriate gas. This has the same advantage of giving control over the shape of the gas pocket.

In a preferred set of embodiments, the methods described herein potentially may be employed to generate nuclear fusion reactions. The fuel for the reaction could be provided by the gas in the pocket, the medium, or the fuel could be provided by the target surface itself. Any of the fuels mentioned in U.S. Pat. No. 7,445,319 is suitable for use in the present invention.

The device in the present invention is not as restricted, regarding size, as U.S. Pat. No. 7,445,319 where the size of the droplet constrains the maximum bubble size. It may be advantageous to have a larger apparatus where a larger volume of gas is heated. The volume of gas in each pocket may be chosen depending on the circumstances but in one set of preferred embodiments it is between $5 \times 10^{-11}$ and $5 \times 10^{-3}$ liters.

The fusion reactions which it may potentially be possible to obtain in accordance with certain embodiments of the invention could be used for net energy production (the long term research aim in this field), but the inventors have appreciated that even if the efficiency of the fusion is below that required for net energy production, the reliable fusion which may potentially be obtainable in accordance with embodiments of the invention is advantageous for example in the production of tritium which can be used as fuel in other fusion projects and is very expensive to produce using currently existing technologies. The potential fusion may also be beneficial in giving a fast and safe neutron source which has many possible applications that will be apparent to those skilled in the art.

Moreover, it is not essential in accordance with the invention to produce fusion at all. For example, in some embodiments the techniques and apparatus of the present invention may be advantageously employed as a sonochemistry reactor or chemical reactor which can be used to access extreme and unusual conditions.

BRIEF DESCRIPTION OF THE DRAWINGS

Certain embodiments of the invention will now be described, by way of example only, with reference to the accompanying drawings, in which:

FIG. 5 shows a variant of the embodiment of FIG. 3a.

DETAILED DESCRIPTION

Figure 1A:
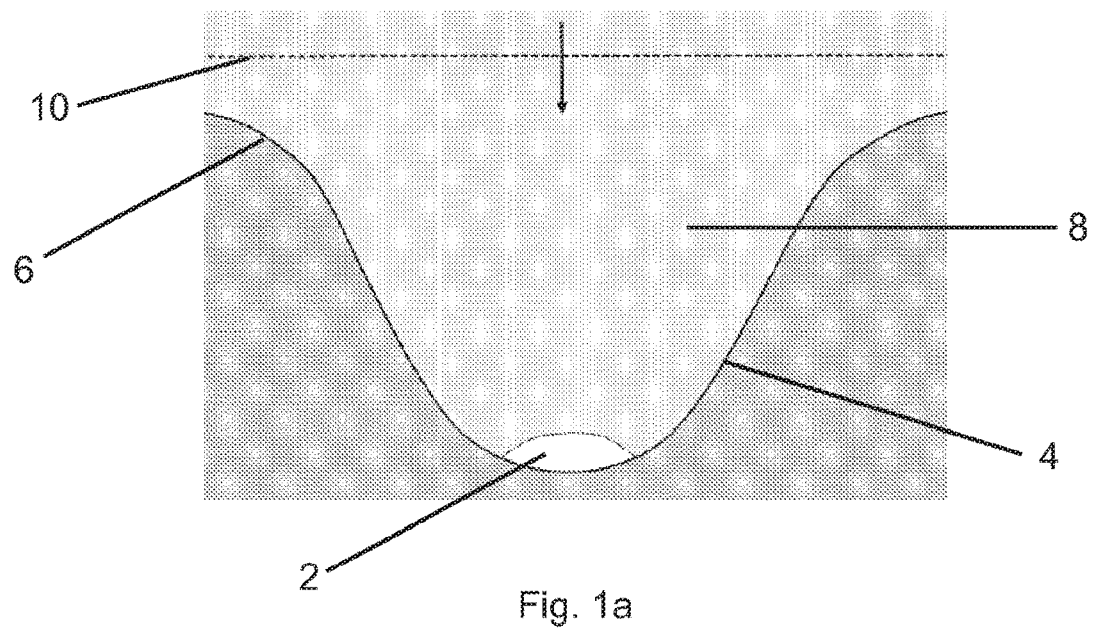
FIGS. 1a and 1b show two variants of a target surface in accordance with one aspect of the invention.
Figure 1B:
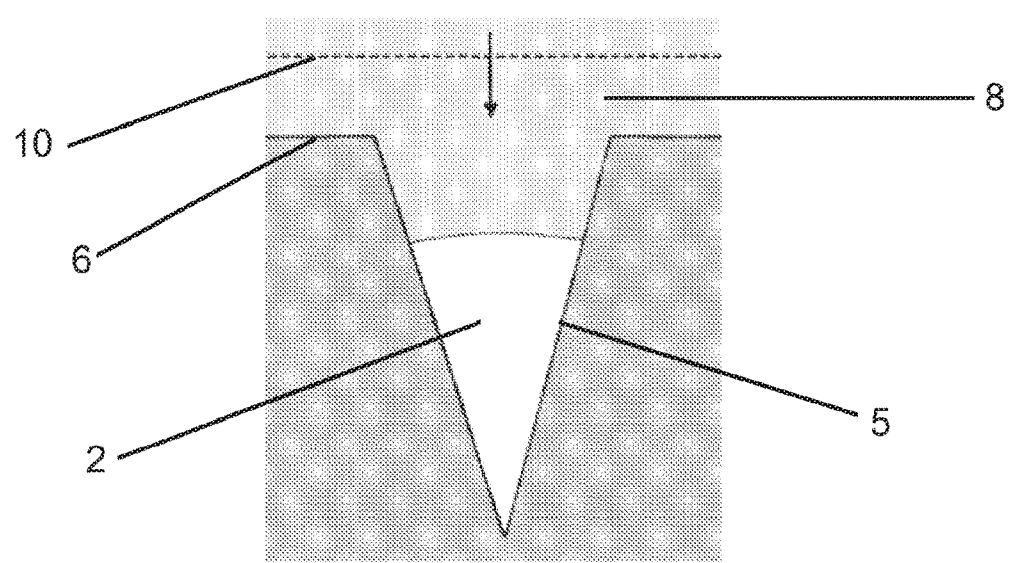

FIGS. 1a and 1b show schematically arrangements in accordance with two respective embodiments of one aspect of the invention. In each case a solid surface 6, for example made from high strength steel, is placed inside a non-gaseous medium 8 in the form of a hydrogel, for example a mixture of water and gelatine. Defined in the hydrogel medium 8 is a gas pocket 2 filled with vaporous fuel which is potentially suitable for taking part in a nuclear fusion reaction. In both cases the gas pocket 2 is attached to the target surface 6 inside a concave depression. In the case of the first embodiment in FIG. 1a, the depression 4 is parabolic and relatively large such that only one side of the gas pocket 2 is attached to the surface 6. The size of the apparatus is flexible but a typical dimension of this diagram could be between 0.1 and $1 \times 10^{-5}$ m.

In the case of the second embodiment in FIG. 1b, the gas pocket 2 is received in a much smaller, V-shaped tapering depression 5 which could be machined or formed as the result of a naturally occurring crack in the surface 6.

In operation a shockwave 10 is created from an explosion, for instance with a pressure of 5 GPa, within the gel medium 8. This is represented in both FIGS. 1a and 1b as a line propagating in the direction of the arrow towards the pocket of gas 2. First the shockwave 10 strikes the upper parts of the target surface 6, causing the shockwave 10 to change shape as it advances towards the pocket of gas 2. In this manner the shape of the shockwave 10 that advances into the pocket of gas 2 can be explicitly controlled by shaping the surface 6 accordingly. The shaped shockwave 10 will then strike the pocket of gas 2, compressing it against the target surface 6 as the shockwave 10 propagates through the gas pocket 2. Reflections of the shockwave 10 from the surface 6 after it has propagated through the pocket 2 travel back through the pocket, reinforcing those propagating from the original direction and further compressing the gas pocket. The compression of the gaseous fuel inside the pocket causes intense local heating which potentially may be sufficient to generate a nuclear fusion reaction.

Figure 2A:
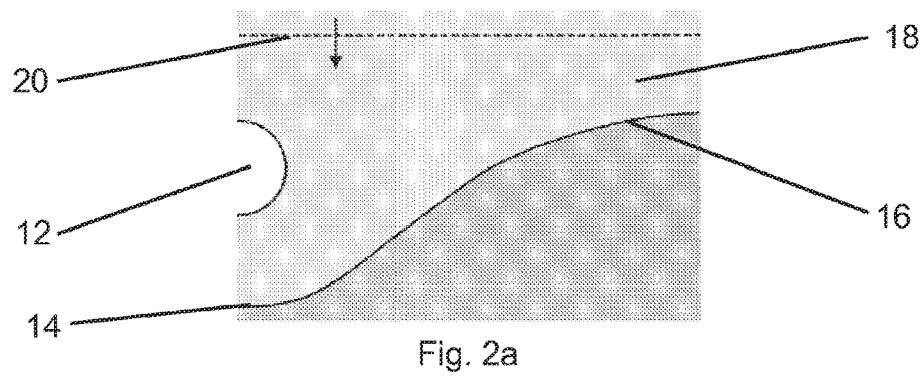
FIGS. 2a, 2b and 2c show three successive stages of an interaction of a shockwave with a pocket of gas in accordance with another aspect of the invention.
Figure 2B:
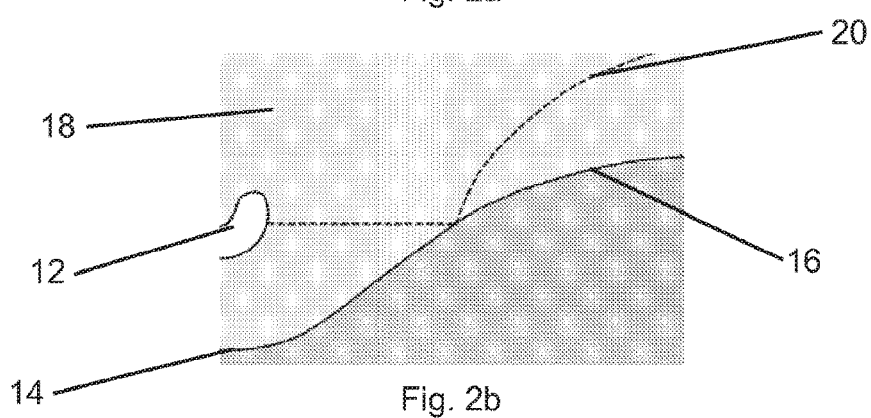
Figure 2C:
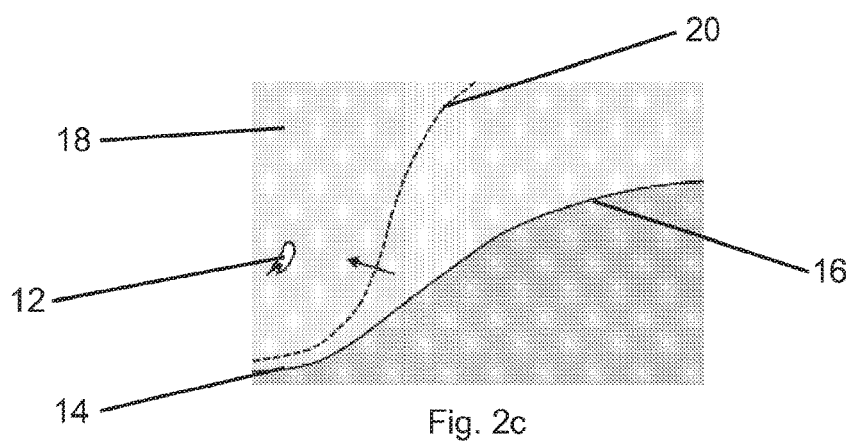

FIGS. 2a, 2b and 2c show three successive stages of a shockwave interacting with a pocket of gas 12 spaced from a surface 16 in accordance with another aspect of the invention. In this embodiment the pocket of gas 12 is immobilized in the gel 18 in a concave depression 14 in the surface 16.

FIG. 2a shows a shockwave 20 propagating through the gel medium 18, in the direction of the arrow, approaching the gas pocket 12. FIG. 2b shows the shockwave 20 as it is incident for the first time upon the gas pocket 12. The shockwave acts on the volume of gas 12 to compress it, in a similar manner to the embodiments shown in FIGS. 1a and 1b. At the same time the shockwave 20 is reflected from the upper sides of the concave depression 14 in the surface 16.

FIG. 2c shows the third snapshot in the sequence, by which time the shockwave 20 has passed through the volume of gas 12, compressing it significantly. Also by this time, the shockwave 20 has been reflected from the surface 16 and is travelling back towards the pocket of gas 12 in the direction indicated by the arrow. The reflected shockwave 20 now has a shape resembling the shape of the concave depression 14 and is focused towards the pocket of gas 12 upon which it is incident for a second time, compressing it further and therefore further increasing the temperature and pressure within it.

Figure 3A:
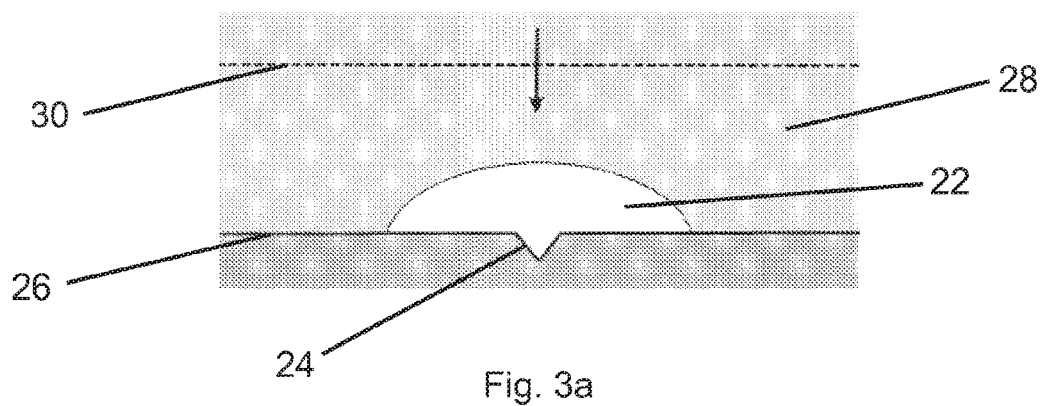
FIGS. 3a and 3b show two successive stages of an interaction of a shockwave with a pocket of gas in accordance with another aspect of the invention.
Figure 3B:
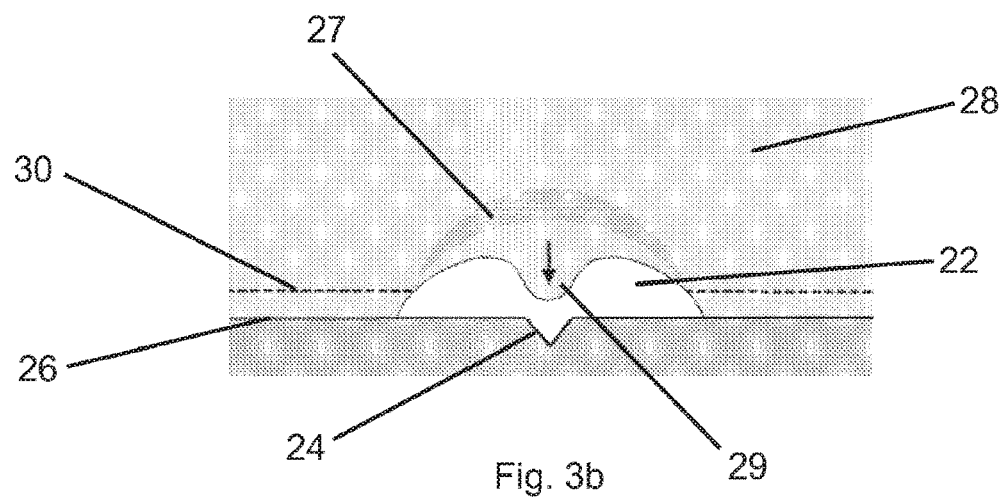

FIGS. 3a and 3b show, in accordance with yet another aspect of the invention, two successive stages of a shockwave interaction with a pocket of gas 22 attached to a surface 26 so as to cover and fill a V-shaped tapering depression 24. Although the tapering depression 24 is of a similar shape to that in FIG. 1b, relative to the size of the tapering depression, the volume of gas in the pocket 22 is much greater than it is in FIG. 1b. For example the width of the bubble could be of the order of 1 cm.

FIG. 3a shows the shockwave 30 propagating through the medium 28 (which could be the same material as in previous embodiments or a different material could be used), in the direction of the arrow, towards the gas pocket 22. FIG. 3b shows a later stage in the interaction, after the shockwave 30 has struck the gas pocket 22. The portion 27 of the shockwave 30 that has struck the edge of the pocket of gas 22 is reflected as a result of the large change in density from the medium 28 to the gas 22. This reflected portion 27 forms a rarefaction fan which propagates away from the gas pocket 22 and therefore creates a low pressure region between the reflected portion 27 and the gas pocket 22. The medium 28 flows into this low pressure region as a jet 29 which then traverses the gas pocket 22, trapping a fraction of the gas therein between the tip of the jet 29 and the tapering depression 24 in the surface 26, thereby causing compression and heating of the gas in the manner previously described.

FIG. 1b shows a further configuration which is also suitable as an embodiment of this aspect of the invention.

Figure 4:
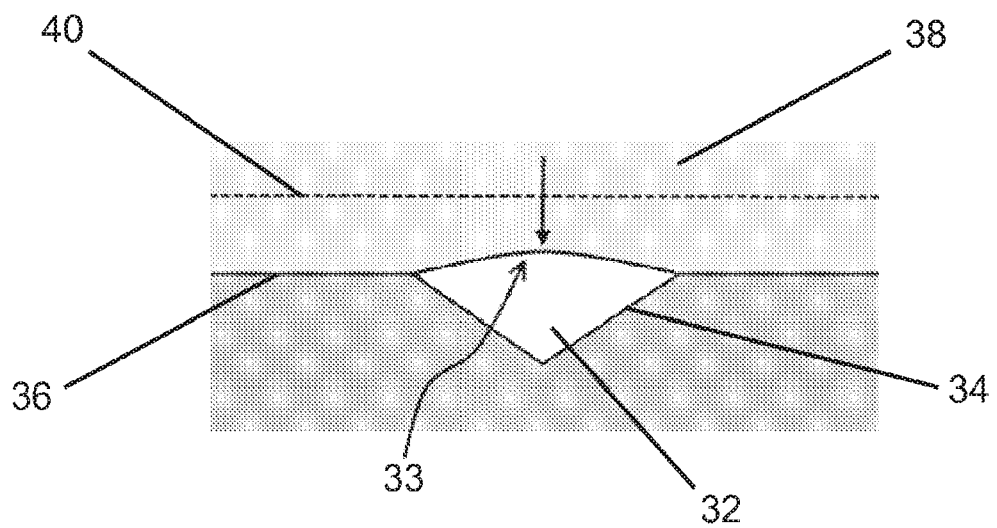
FIG. 4 shows a further embodiment of the invention.

FIG. 4 shows a further embodiment of the previous aspect of the invention in which a pocket of gas 32 is attached to a target surface 36 in a tapering depression 34. This embodiment is different from those previously described in that the pocket of gas 32 is separated from the medium 38 by a prefabricated membrane 33. The prefabricated membrane 33 is frangible i.e. it is designed to break on the impact of the shockwave 40. Once the prefabricated membrane 33 has been broken by the impact of the shockwave 40, the shockwave 40 continues to propagate into the depression 34 compressing the pocket of gas 32 in the same manner as for the previous embodiments.

Figure 5:
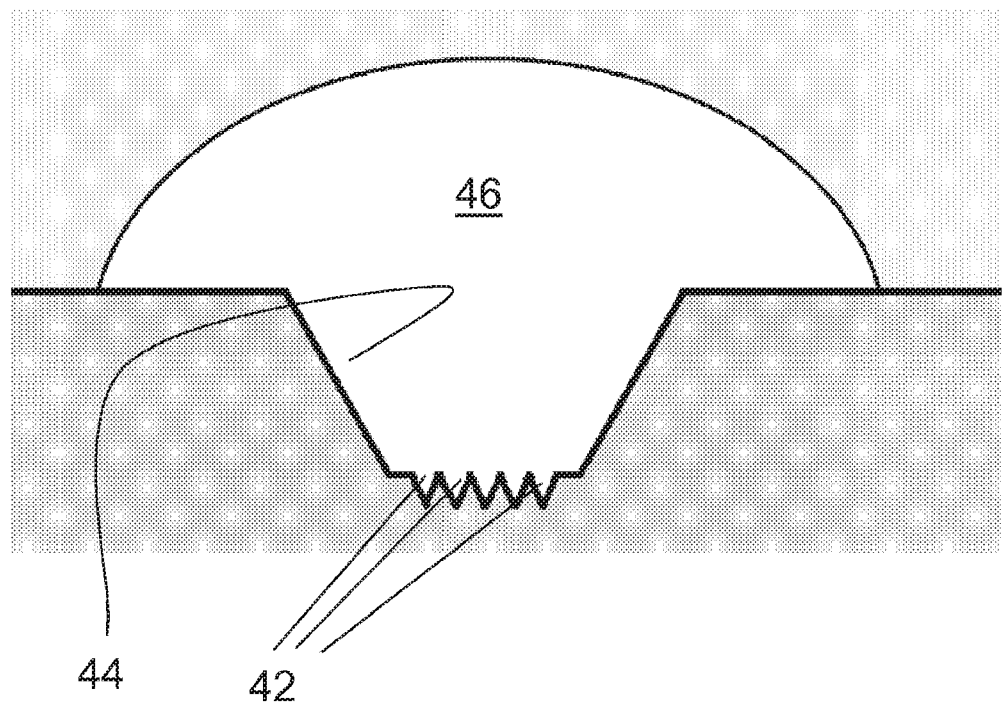

FIG. 5 is a variant of the embodiment shown in FIG. 3a. In this embodiment there are multiple smaller depressions 42 at the bottom on a large depression 44. The pocket of gas 46 is partially received both by the large depression 44 and by the multiple smaller depressions 42. In operation of this embodiment the jet formed when the shockwave (not shown) hits the pocket of gas 46 will highly compress multiple small volumes of the gas by trapping them in the small depressions 42, in a similar manner to that described above with reference to FIGS. 3a and 3b.

Although specific examples have been given, it will be appreciated that there are a large number of parameters that influence the actual results achieved, for example liquid or gel medium density, ambient pressure and temperature, composition of the gas and of the liquid or gel, impact angle of the shockwave, target surface shape and micro-structure of the target surface.

In each of the embodiments described above, the diagrams shown are a vertical cross-section through a three-dimensional volume of gas and target surface and hence they depict embodiments that are rotationally symmetric. However, this is not essential to the invention. In particular the surface could comprise discrete surface portions in the rotational direction either instead of, or as well as in the vertical cross-section shown. In the latter case the target surface would be multi-facetted. Each facet could give rise to separate but converging shockwaves.

In all of the embodiments described, the apparatus can be used by creating a shockwave in the medium which is incident upon a volume of gas containing deuterated water vapor.

In numerical modeling of the experiment, the techniques described herein give rise to a peak pressure of ~20 GPa which is sufficient to cause temperatures inside the collapsed volume of gas in excess of $1 \times 10^6$ Kelvin which potentially may be sufficient for a nuclear fusion reaction of the deuterium atoms. In some non-limiting examples the resulting neutrons could be used in other processes, or could be absorbed by a neutron absorber for conversion of the kinetic energy of the neutrons to thermal energy and thus conventional thermodynamic energy generation.

The invention claimed is:

1. A method of producing a localised compression of gas, comprising:
   providing a non-gaseous medium having therein a pocket of gas,
      wherein the pocket of gas is attached to a bottom or centre point of a concave surface,
         wherein the concave surface is shaped to concentrate intensity of a shockwave incident upon the pocket of gas,
   creating at least one shockwave propagating through the non-gaseous medium so as to be incident upon the pocket of gas,
      wherein the at least one shockwave causes the pocket of gas to collapse,
         wherein the collapse of the pocket of gas causes a jet of the non-gaseous medium to form that traverses the pocket of gas towards and impacts against the concave surface, and
         wherein the concave surface is arranged to receive the jet impact such that at least some of the gas from the original pocket of gas is trapped by the impacting jet against the concave surface,
            wherein the gas trapped by the impacting jet against the concave surface is compressed,
               wherein the compression is enhanced by the at least one shockwave.

2. A method as claimed in claim 1, wherein the surface comprises a plurality of discrete portions.

3. A method as claimed in claim 2, wherein the discrete portions are piecewise polynomial.

4. A method as claimed in claim 1, wherein the surface has a depth greater than its width.

5. A method as claimed in claim 1, wherein the surface comprises a plurality of concave portions.

6. A method as claimed in claim 1, wherein the concave surface has a plurality of gas pockets attached thereto.

7. A method as claimed in claim 1, comprising using an explosive device to create the shockwave with a pressure of between 0.1 GPa and 50 GPa.

8. A method as claimed in claim 1, comprising using an explosive device to apply one or more shockwaves to a static volume of non-gaseous medium to create the at least one shockwave propagating through the non-gaseous medium.

9. A method as claimed in claim 1, wherein the gas pocket is formed with the use of a pre-manufactured membrane that defines the boundary between the gas pocket and the non-gaseous medium.

10. A method as claimed in claim 9, wherein the membrane is frangible and is arranged to break upon impact from the shockwave.

11. A method as claimed in claim 9, wherein the prefabricated membrane includes a line or region of weakness.

12. An apparatus for producing a localised compression of gas comprising:
   a non-gaseous medium having therein a pocket of gas,
      wherein the pocket of gas is attached to a bottom or centre point of a concave surface; and
   means for creating at least one shockwave propagating through said medium so as to be incident upon said pocket of gas, wherein the at least one shockwave causes the pocket of gas to collapse, wherein the collapse of the pocket of gas causes a jet of the non-gaseous medium to form that traverses the pocket of gas towards and impacts against the concave surface, and
   wherein said concave surface is shaped to concentrate the intensity of the shockwave which is incident upon the pocket of gas,
      wherein the concave surface is arranged to receive the jet impact such that at least some of the gas from the original pocket of gas is trapped by the impacting jet against the concave surface,
         wherein the gas trapped by the impacting jet against the concave surface is compressed,
            wherein the compression is enhanced by the at least one shockwave.

13. An apparatus as claimed in claim 12, wherein the non-gaseous medium comprises a static volume of non-gaseous medium and the arrangement comprises an explosive device for applying one or more shockwaves to the static volume of non-gaseous medium to create the at least one shockwave propagating through the non-gaseous medium.

* * * * *